United States Patent [19]

Garrett

[11] 4,374,629

[45] Feb. 22, 1983

[54] SYNTHETIC SEAWEED

[76] Inventor: William L. Garrett, 100 Dickinson La., West Park, Wilmington, Del. 19807

[21] Appl. No.: 178,856

[22] Filed: Aug. 18, 1980

Related U.S. Application Data

[63] Continuation-in-part of Ser. No. 6,567, Jan. 6, 1979, Pat. No. 4,221,500.

[51] Int. Cl.³ .............................................. E02B 3/04
[52] U.S. Cl. ....................................................... 405/24
[58] Field of Search ...................... 405/21, 23, 24, 25, 405/27, 28, 32, 66; 428/17

[56] References Cited

U.S. PATENT DOCUMENTS 3,299,640 1/1967 Nielsen ................................. 405/24
3,638,430 2/1972 Smith ................................... 405/66

FOREIGN PATENT DOCUMENTS 377004 6/1923 Fed. Rep. of Germany ........ 405/27
2252009 6/1975 France .................................. 405/27
7710671 4/1979 Netherlands ......................... 405/25

*Primary Examiner*—David H. Corbin
*Attorney, Agent, or Firm*—Connolly and Hutz

[57] ABSTRACT

Synthetic seaweed for underwater installation comprises an elongate anchor and at least one sheet of flexible material adjacent the anchor. Fastening means secures a first edge portion of the sheet to the anchor along at least a portion thereof so that the sheet extends outwardly therefrom terminating at an outer boundary edge portion. Perforations are provided in the sheet whereby resistance of the sheet to underwater currents is reduced. The sheet may be cut into strips and buoyant material may be associated with the seaweed in its sheet or strip forms to increase the buoyancy of the finished product. In use, the anchor rests on the bottom of the sea and the submerged flexible sheets or strips extend upwardly therefrom. These sheets or strips sway in the ocean water thereby reducing currents in the surrounding water which promotes marine life and/or permits accretion of suspended sand and sedimentation of solid particles.

1 Claim, 7 Drawing Figures

U.S. Patent   Feb. 22, 1983   Sheet 1 of 2   4,374,629
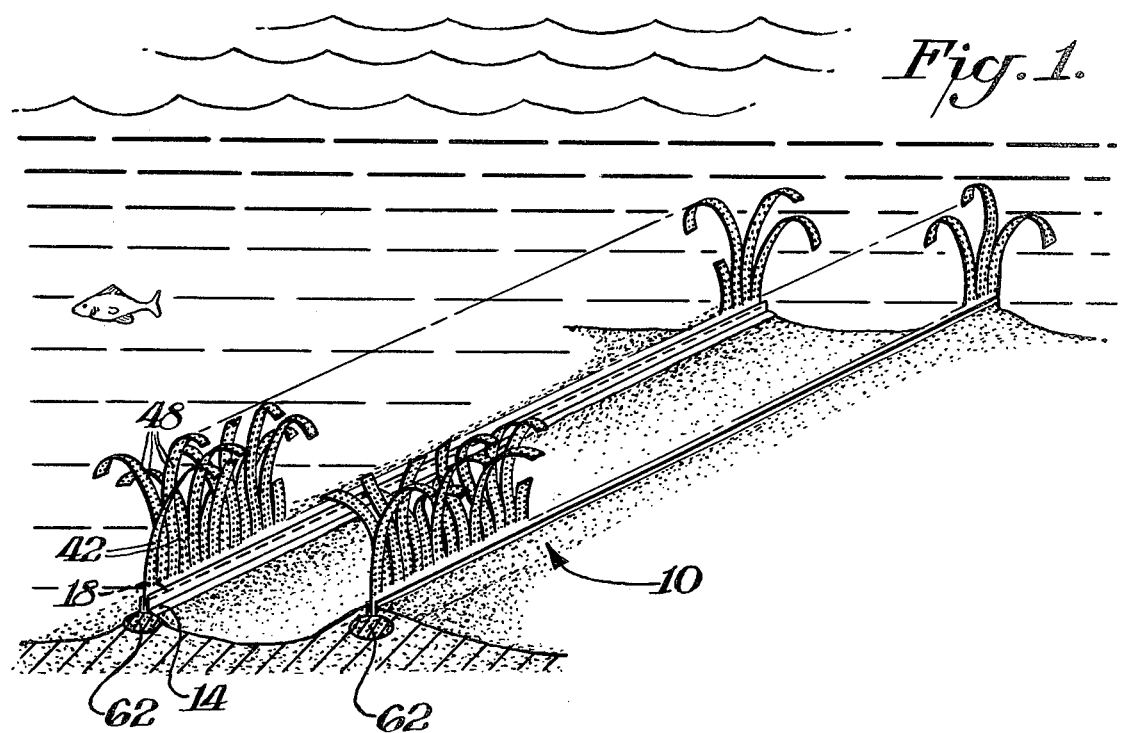
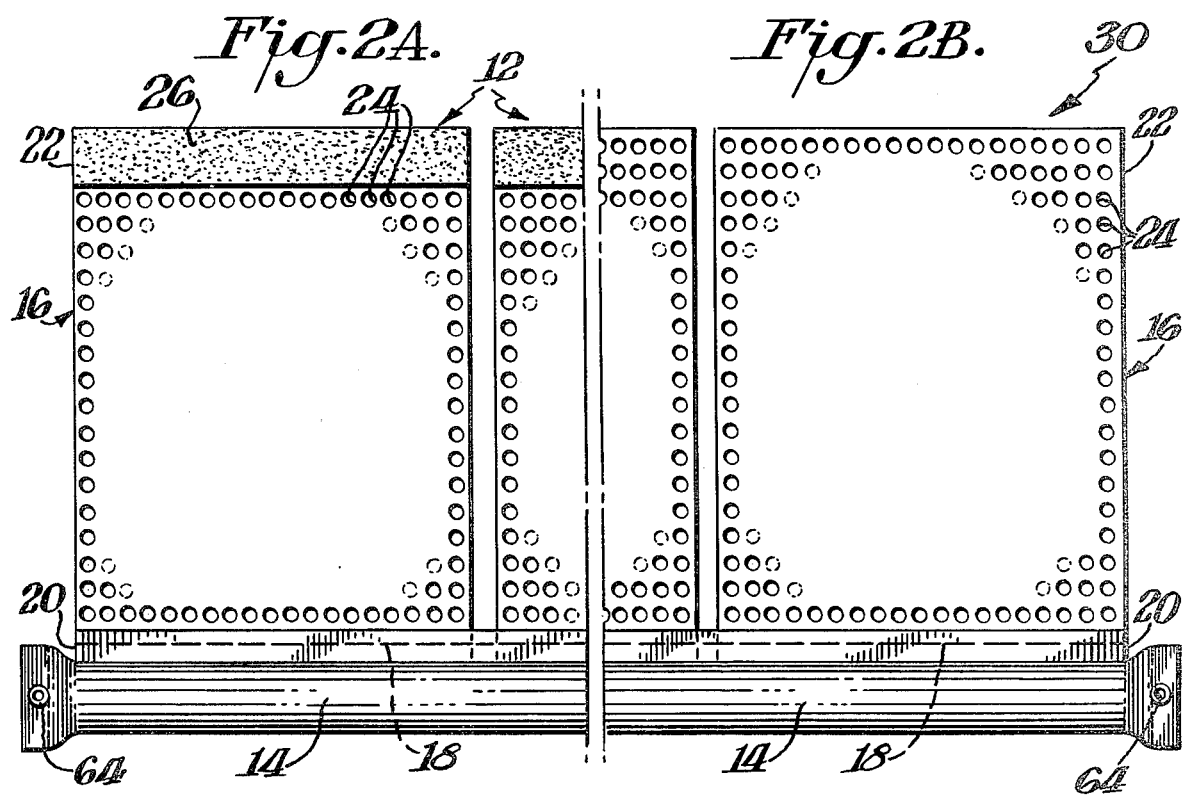

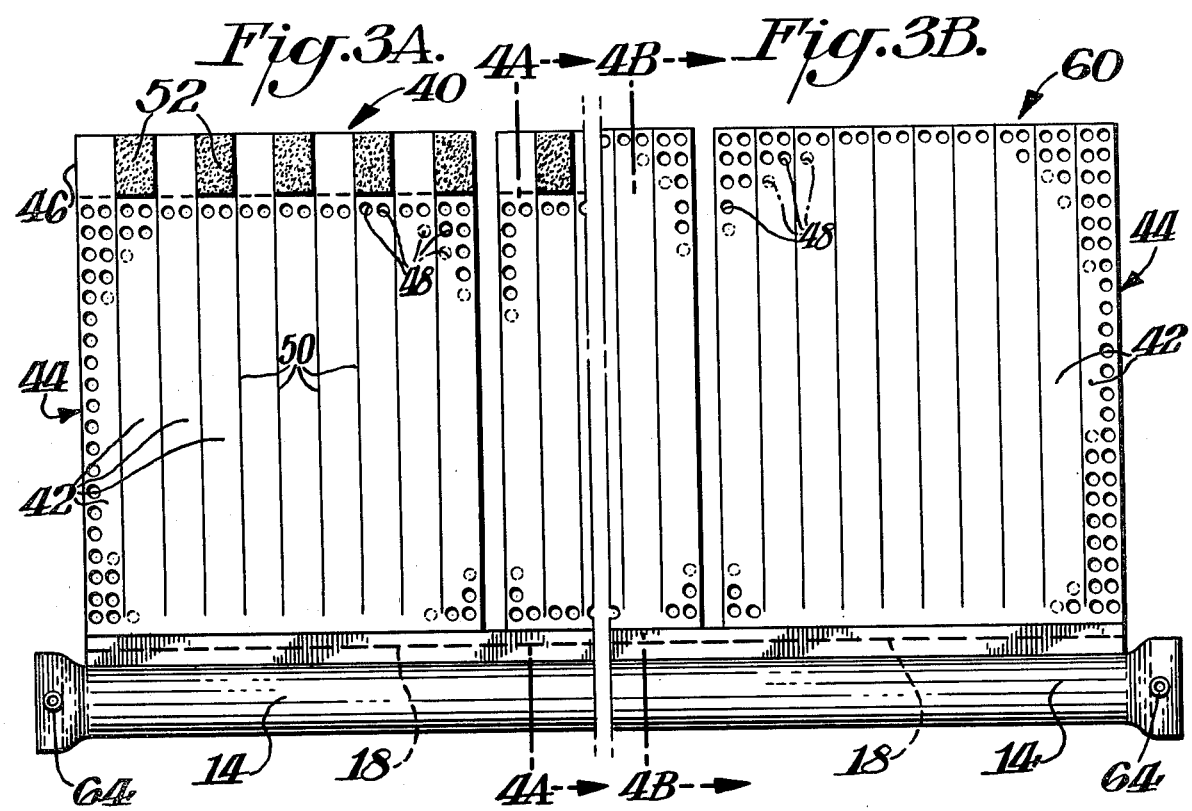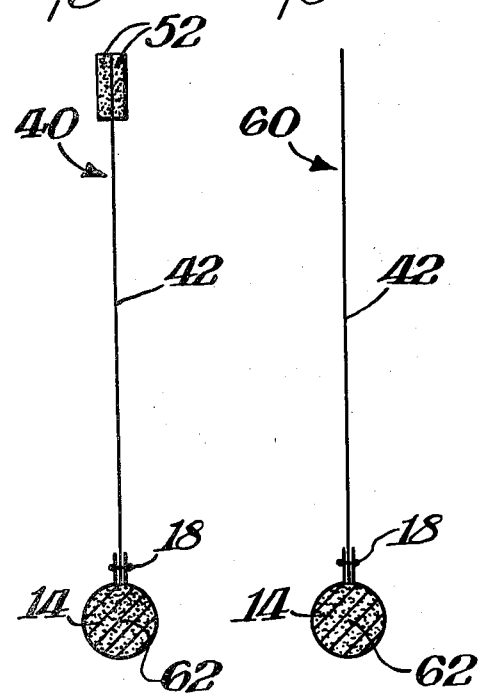

4,374,629

SYNTHETIC SEAWEED

CROSS REFERENCE TO RELATED APPLICATION

The present application is a continuation-in-part of application Ser. No. 6,567, filed Jan. 26, 1979, now U.S. Pat. No. 4,221,500 and the disclosure thereof is incorporated herein by reference.

BACKGROUND OF THE INVENTION

The present invention relates to synthetic seaweed and more particularly to such seaweed for use in promoting marine life and/or in building an underground reef whose purpose is to inhibit coastal erosion.

Prior to the present invention, artificial seaweed constructions have been proposed for dealing with coastal erosion problems. For example, U.S. Pat. No. 3,299,640, granted Jan. 24, 1967, describes a seaweed type structure for influencing the sub-marine migration of material. This structure consists of a screen formed by a large series of filamentary plastic strands secured at one end to an anchoring device placed at the bottom of the sea. The strands are buoyant and therefore assume and retain an upright position thereby reducing currents in the surrounding water while promoting the deposition of sand and other solid materials entrained by the water. Also shown in the above patent is a group of individual spaced apart buoyant tapes secured to a rope-like anchor. In each instance the function of these constructions is to combat coastal erosion.

U.S. Pat. Nos. 3,559,407 and 3,590,585, granted Feb. 2, 1971 and July 6, 1971, respectively, also disclose artificial seaweed wherein assemblages of filamentary strands of foamed, stretched polyolefin are used for influencing the migration of material at the bottom of bodies of water, as in combatting coastal erosion. Entanglement of the filamentary strands is troublesome during manufacture, installation and use, and U.S. Pat. No. 3,590,585 discusses several approaches to prevent such entanglement.

Obviously, it is important that once any artificial seaweed construction is installed, such construction functions to perform its intended purpose. In the case of artificial seaweed installed under water for the purpose of promoting sedimentation of solid particles, it is essential that the seaweed be sufficiently strong to withstand the ocean forces and also particularly designed so that the seaweed remains free of entanglement.

SUMMARY OF THE INVENTION

Accordingly, it is an object of the present invention to provide a unique form of synthetic seaweed having high strength which is easy to make and effective to use for underwater installation in promoting marine life and/or inhibiting coastal erosion.

Still another object of the present invention is to provide a wide range of buoyancies of the materials comprising the artificial seaweed in order to produce a product having the optimum resistance to underwater current flows.

In accordance with the present invention, synthetic seaweed for underwater installation comprises an elongate anchor with at least one sheet of flexible material adjacent the anchor. Fastening means secures a first edge portion of the sheet to the anchor along at least a portion thereof so that the sheet extends outwardly therefrom terminating at an outer boundary edge portion. Perforations are provided in the sheet whereby resistance of the sheet to underwater currents is reduced. The anchor serves to hold the synthetic seaweed at the bottom of the sea and the perforated flexible sheet functions to effectively reduce ocean currents in the surrounding water which promotes marine life and/or causes sedimentation to thereby permit accretion of suspended sand. In essence, the synthetic seaweed herein functions to promote marine life and/or a buildup of the ocean bottom in the same manner as sea vegetation.

The perforated sheet may be buoyant with or without added buoyancy secured to the exterior portions of the sheet. Also, the sheet may have a specific gravity greater than that of sea water with buoyant material applied thereto to provide the needed buoyancy. The buoyant material secured to the flexible sheet enhances the ability of the sheet to maintain an upright position under the water. Additionally, the perforations in the sheet enhance this upright positioning.

The perforated sheet may have a series of spaced apart substantially parallel cuts extending from the outer boundary edge portion inwardly toward the anchor to thereby provide a plurality of strips each having a plurality of perforations therein. Tabs of buoyant material may be secured to at least some of the strips to enhance the buoyancy thereof or to provide the necessary buoyancy to maintain the strips in an upright position under the water.

The anchor may comprise a cylindrical tube of flexible material closed at its opposite ends and filled with ballast. The flexible material forming the anchor may be the same as the material forming the sheet or strips, and the most convenient ballast is sand although other types of ballast may be used.

It is preferred that the length of the sheet or each strip be within the range of two feet to fifteen feet, the most preferred length being four feet to eight feet. Also, the width of the strips may be within the range of one-quarter inch to six inches, with two inches to three inches being preferred.

BRIEF DESCRIPTION OF THE DRAWINGS

Novel features and advantages of the present invention in addition to those noted above will become apparent to those persons skilled in the art from a reading of the following detailed description in conjunction with the accompanying drawings wherein:

FIG. 1 is a diagrammatic view illustrating one form of synthetic seaweed in actual use, according to the present invention;

FIG. 2A is a side elevational view of the sheet form of synthetic seaweed, according to the present invention, with the righthand portion thereof broken away;

FIG. 2B is a side elevational view similar to FIG. 2A illustrating another sheet form of synthetic seaweed, according to the present invention, with the lefthand portion thereof broken away;

FIG. 3A is a side elevational view of the strip form of synthetic seaweed, according to the present invention, with the righthand portion thereof broken away;

FIG. 3B is a side elevational view similar to FIG. 3A illustrating another strip form of synthetic seaweed, according to the present invention, with the lefthand portion thereof broken away;

FIG. 4A is a sectional view taken along line 4A of FIG. 3A; and

FIG. 4B is a sectional view taken along line 4B—4B of FIG. 3B.

DETAILED DESCRIPTION OF THE INVENTION

Referring in more particularity to the drawings, FIG. 1 shows synthetic seaweed 10 for use in promoting marine life and/or inhibiting coastal erosion. It is well known that sea vegetation promotes the sedimentation of suspended sand and other solid particles to thereby cause a buildup of these particles in the general location of the vegetation. This is accomplished by the vegetation which acts as a barrier to thereby reduce currents in the surrounding water which permits the sedimentation of the water borne particles. The present synthetic seaweed functions in substantially the same manner and may be installed where there is an absence of sea vegetation to reduce water currents and thereby promote sedimentation of solid particles. This results in a buildup of the ocean bottom in the form of an underground reef whose purpose is to inhibit coastal erosion. Additionally, the synthetic seaweed herein functions to promote marine life such as the growth of natural sea vegetation. Such growth is believed to occur because of the reduced currents in the vicinity of the synthetic seaweed. Also, underwater installations of the synthetic seaweed herein provide a haven for fish, crustaceans, and other forms of marine life.

One form of synthetic seaweed is shown in detail in FIG. 2A. Specifically, the seaweed 12 comprises an elongate anchor 14 with a sheet of flexible material 16 adjacent the elongate anchor. Stitching 18 secures a first edge portion 20 of the sheet 16 to the anchor 14 so that the sheet extends outwardly therefrom terminating at an outer boundary edge portion 22. Perforations 24 are provided in the flexible sheet 16 in order to reduce the resistance of the sheet to underwater currents, as explained more fully below.

The outer boundary edge portion 22 of the perforated flexible sheet 16 may be provided with a strip of highly buoyant material 26, such as closed cell, foamed polyethylene or other similar material. The strip of buoyant material may be secured by adhesive or stitching or any convenient method and serves to enhance the overall buoyancy of the flexible sheet 16 when it is made of buoyant material. The sheet then has more of a tendency to extend upright in the water when the water current is high. Also, when the flexible sheet 16 is made of material having a specific gravity greater than sea water, the strip 26 of buoyant material provides the necessary buoyancy to the overall seaweed construction. The buoyant material 26 may be secured to one or the other sides of the outer boundary edge portion 22, or both sides thereof depending upon the amount of buoyancy being built into the overall seaweed construction.

One of more sheets 16 may be secured to the anchor 14 within the scope of the present invention. In each instance, however, the sheets are perforated and it is preferred that the perforations 24 be circular in shape each having a diameter of one-quarter inch to one inch. The percent open area of the perforated sheet may be five percent to ninety percent, preferably twenty-five to fifty percent. Also, other forms of perforations may be used, such as single slits or X's, for example.

The flexible material comprising the sheet 16 may be a synthetic non-woven material which has certain advantages in the overall construction of the synthetic seaweed 12. A non-woven material is important since it is inexpensive and the edge portions do not unravel. Additionally, by utilizing a non-woven sheet in the manufacture of the present synthetic seaweed, the techniques employed to produce the finished product are quite simple. For example sheet 16 may be TYVEK, TYPAR or REEMAY, all manufactured and sold by E. I. duPont de Nemours & Company. TYPAR is a continuous filament polypropylene having high strength per unit weight, and is therefore preferred. TYVEK is a high density polyethylene, and REEMAY is a polyester. TYVEK and TYPAR each have a specific gravity less than water which makes them buoyant. On the other hand REEMAY has a specific gravity slightly greater than water.

Other non-woven materials that may be used include MIRIFI, manufactured by Celanese Corporation; BIDIM, manufactured by Monsanto Company; and SUPAC, manufactured by Phillips Petroleum Company. Any other wet, dry laid, or needled non-woven material which when cut does not unravel and which has sufficient strength to withstand ocean current forces may be used.

Preferably the weight of the sheet 16 of non-woven material is within the range of one-half to twelve ounces per square yard, preferably three to six ounces per square yard. Also, it is preferred that the tensile strength of the non-woven sheet 14 be such that a one inch strip thereof has a breaking strength of 10 to 70 pounds.

While non-woven material is preferred, other flexible materials may also be used in fabricating the synthetic seaweed 12 of the present invention, such as wovens, films, plastics, metal foils or fiber materials, for example, with one requirement being that the material selected have the necessary strength to withstand underwater currents when installed.

FIG. 2B illustrates another sheet form of synthetic seaweed 30 according to the present invention. The seaweed 30 is identical in all respects to the seaweed 12 except that the construction 30 does not include any buoyant material. Since the synthetic seaweed 30 does not include any buoyant material at the outer boundary edge portion 22, it is necessary that the material from which the perforated sheet 16 is fabricated have a specific gravity less than that of sea water. This will enable the sheet to extend upright in the water after installation.

FIG. 3A illustrates another embodiment of the present invention wherein the synthetic seaweed 40 includes a plurality of strips 42. Specifically, the synthetic seaweed 40 includes an elongate anchor 14 similar to the anchors shown in FIGS. 2A and 2B. At least one sheet 44 of flexible material is adjacent the elongate anchor and stitching 18 functions to secure the sheet 44 to the anchor 14 along at least a portion thereof. The sheet terminates at an outer boundary edge portion 46, and perforations 48 are provided throughout the sheet to reduce the resistance of the sheet to underwater currents. Parallel cuts 50 function to separate the sheet 44 into a series of the strips 42. The resultant structure is a plurality of such strips 42 each having a plurality of perforations therein.

In the embodiment of the invention shown in FIG. 3A, the outer boundary portion 46 of each of one side of every other strip 42 includes a tab 52 of highly buoyant material secured thereto. The material may be a closed cell, polyethylene or other similar material. Additionally, the remaining strips each have a tab 52 of highly buoyant material secured to the other side at the outer boundary edge portion. In the resultant structure the tabs 52 are secured to every other strip on one side thereof with tabs 52 on the remaining strips on the opposite side. Alternatively, the tabs 52 may be provided on the same side of every strip or both sides thereof, if desired. These tabs may be secured by adhesive or stitching or any convenient method and serve to enhance the overall buoyancy of the strips when the flexible sheet 44 is made of buoyant material. Also, when the sheet is made of materials having a specific gravity greater than sea water, the tabs 52 provide the needed buoyancy.

The materials from which the sheet 44 is fabricated are the same as discussed above in conjunction with the embodiments of FIGS. 2A and 2B. The arrangement of perforations is also similar.

FIG. 3B illustrates another strip-type synthetic seaweed 60 according to the present invention, which is identical to the synthetic seaweed 40 except that no buoyant material is located at the outer boundary edge portion of the strips. In this particular embodiment it is important that the material forming the sheet 44 and strips 42 has a specific gravity less than that of sea water.

In the embodiments of the invention shown in FIGS. 2A and 3A, the amount of buoyant material may be varied as little as one inch along the outer boundary portion to an amount covering up to the full length thereof. Closed cell, non-water absorbent foam is available in a broad range of densities, thicknesses, and widths, and when these materials are affixed to the sheets or strip the buoyancy may be varied as desired to meet the resistance requirements of specific underwater current forces.

The length of the sheet 16 or the strips 42 is preferably within the range of two feet to fifteen feet, the most preferred range being four feet to eight feet. The width of the strips 42 is preferably in the range of one-quarter inch to six inches, with a most preferred range of two inches to three inches.

The anchor 14 preferably comprises a cylindrical tube of flexible material closed at its opposite ends and filled with ballast 62, such as sand. The tube may be filled with any convenient and inexpensive ballast material, and the diameter thereof may be varied depending upon underwater conditions and the particular seaweed construction. When sand is used as ballast, the tube diameter may be between twelve inches and twenty-four inches, for example. Also, although stitches 18 are shown as the means for securing the sheets 16 and 44 to the anchor 14, other types of securement may be utilized within the scope of the invention.

In use, one end of the anchor 14 may be closed during the manufacturing operation with the other end closed at the site of installation after the tube is filled with sand, for example. The synthetic seaweed is then installed as diagrammatically shown in FIG. 1 and either the sheets 16 of the embodiment shown in FIGS. 2A and 2B or the strips 42 of the embodiment shown in FIGS. 3A and 3B sway in the water currents. As such, these sheets or strips acts as a barrier to promote sedimentation of suspended sand and other solid particles entrained by the water. Ultimately this causes a buildup of the sea bottom and such buildup functions to inhibit beach erosion. Alternatively or simultaneously, underwater installations of the synthetic seaweed herein promote marine life by enabling nature vegetation to grow and/or provide havens for fish, crustaceans, and the like. The perforated characteristic of the synthetic seaweed substantially reduces the resistance of the sheet or the strip to underwater currents thereby enhancing the ability of the seaweed to maintain an upright position. Grommets 64 are provided at the ends of the anchor 14 for interconnecting a series of seaweed units.

What is claimed is:

1. Synthetic seaweed for underwater installation comprising an elongate anchor, a plurality of flexible strips of material having a specific gravity less than that of sea water secured to the elongate anchor extending outwardly therefrom and terminating at free end portions, each strip having a width within the range of one-quarter inch to six inches and a length within the range of two to fifteen feet, a plurality of perforations in each of the strips whereby resistance of the strips to underwater currents is reduced, the percent open area of the perforations being approximately twenty-five to fifty percent, and tabs of buoyant material secured to the exterior of at least the free end portions of at least some of the strips.

* * * * *